United States Patent
Chai et al.

(10) Patent No.: US 12,451,564 B2
(45) Date of Patent: Oct. 21, 2025

(54) BATTERY CELL, BATTERY, AND ELECTRICAL DEVICE

(71) Applicant: Contemporary Amperex Technology (Hong Kong) Limited, Hong Kong (CN)

(72) Inventors: Zhisheng Chai, Fujian (CN); Shengwang Chen, Fujian (CN); Dongsheng Sun, Fujian (CN); Lingyan Jiang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/069,294

(22) Filed: Mar. 4, 2025

(65) Prior Publication Data

US 2025/0202062 A1   Jun. 19, 2025

Related U.S. Application Data

(63) Continuation of application No. PCT/CN2023/074838, filed on Feb. 7, 2023.

(51) Int. Cl.
*H01M 50/477* (2021.01)
*H01M 50/107* (2021.01)
(Continued)

(52) U.S. Cl.
CPC ....... *H01M 50/477* (2021.01); *H01M 50/107* (2021.01); *H01M 50/474* (2021.01); *H01M 50/566* (2021.01); *H01M 2220/20* (2013.01)

(58) Field of Classification Search
CPC ............. H01M 50/477; H01M 50/107; H01M 50/474; H01M 50/566; H01M 2220/20
See application file for complete search history.

(56) References Cited

U.S. PATENT DOCUMENTS

| 2018/0323476 A1* | 11/2018 | Pasma ................. H01M 50/533 |
| 2023/0033282 A1* | 2/2023 | Su ....................... H01M 50/107 |
| 2024/0204313 A1* | 6/2024 | Hwangbo ......... H01M 50/1243 |

FOREIGN PATENT DOCUMENTS

| CN | 215497007 U | 1/2022 |
| CN | 114204223 A | 3/2022 |

(Continued)

OTHER PUBLICATIONS

International Search Report mailed on Sep. 1, 2023, received for PCT Application PCT/CN2023/074838, filed on Feb. 7, 2023, 4 pages including English Translation.

*Primary Examiner* — Victoria H Lynch
(74) *Attorney, Agent, or Firm* — XSENSUS LLP

(57) ABSTRACT

This application provides a battery cell, a battery, and an electrical device. The battery cell includes a shell, an electrode post, an electrode assembly, and an insulation piece. The shell includes a sidewall and a first end wall connected to the sidewall. The electrode post is dielectrically mounted on the first end wall of the shell. The electrode assembly is located in the shell. The electrode assembly includes a first tab. The first tab faces the first end wall and is electrically connected to the electrode post. The insulation piece includes a first insulation portion located between the bottom wall and the first tab, and a second insulation portion peripherally disposed at an outer edge of the first insulation portion and protrudes toward a side at which the electrode assembly is located.

22 Claims, 7 Drawing Sheets

(51) Int. Cl.
*H01M 50/474* (2021.01)
*H01M 50/566* (2021.01)

(56) References Cited

FOREIGN PATENT DOCUMENTS

| CN | 217239587 U | 8/2022 |
| CN | 115275539 A | 11/2022 |
| CN | 115347332 A | 11/2022 |

\* cited by examiner

C-C

BATTERY CELL, BATTERY, AND ELECTRICAL DEVICE

CROSS-REFERENCE TO RELATED APPLICATION

This application is a continuation of international application No. PCT/CN2023/074838, filed on Feb. 7, 2023, which is incorporated herein by reference in its entirety.

TECHNICAL FIELD

This application relates to the field of battery technology, and in particular, to a battery cell, a battery, and an electrical device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

Safety of batteries is critical. In some cases, a positive electrode plate and a negative electrode plate in the battery are electrically connected to corresponding electrode terminals to lead out and transmit electrical energy to an electrical device. How to maintain reliable insulation between conductive paths of different polarities inside a battery cell to avoid short circuits is a pressing technical challenge.

SUMMARY

This application aims to solve at least one of technical problems in the related art. For this purpose, an objective of this application is to provide a battery cell, a battery, and an electrical device to improve reliability of insulation between conductive paths inside the battery.

According to a first aspect, an embodiment of this application provides a battery cell. The battery cell includes a shell, an electrode post, an electrode assembly, and an insulation piece. The shell includes a sidewall and a first end wall connected to the sidewall. The electrode post is dielectrically mounted on the first end wall. The electrode assembly is located in the shell. The electrode assembly includes a first tab. The first tab faces the first end wall. The insulation piece includes a first insulation portion and a second insulation portion. The second insulation portion is peripherally disposed at an outer edge of the first insulation portion and protrudes toward a side at which the electrode assembly is located. The first insulation portion is located between the first end wall and the first tab, and at least a part of the second insulation portion is located between the first tab and the sidewall.

In the technical solution provided in this embodiment of this application, by disposing an insulation piece that includes a first insulation portion and a second insulation portion in the shell, this application can implement insulation between the electrode assembly and the shell from different directions, thereby reducing the probability of short circuits inside the battery.

In some embodiments, the second insulation portion includes a guide portion. The guide portion is located at one end of the second insulation portion, the end being away from the first insulation portion. Along a direction away from the first insulation portion, an inner surface of the guide portion is inclined closer to the sidewall. The inner surface of the guide portion is inclined so that, during assembling, the electrode assembly can more easily enter the accommodation cavity defined by the second insulation portion, and can be connected to the electrode post.

In some embodiments, the guide portion gradually tapers in thickness along the direction away from the first insulation portion. The guide portion that tapers in thickness can improve the utilization of the space in the shell, and reduce the capacity loss of the battery.

In some embodiments, the second insulation portion includes a connecting portion. Two ends of the connecting portion are connected to the first insulation portion and the guide portion respectively. A thickness of the connecting portion is greater than or equal to a maximum thickness of the guide portion. The thickness of the connecting portion is greater than or equal to the maximum thickness of the guide portion, thereby facilitating the manufacture and processing of the insulation piece, and reducing the difficulty of manufacture and processing. On the other hand, the relatively small thickness of the guide portion can reduce the space occupied in the shell.

In some embodiments, a difference between the thickness of the connecting portion and a thickness of the first insulation portion is less than or equal to 0.2 mm. Controlling the thickness difference to be less than or equal to 0.2 mm can facilitate the manufacture and molding of the insulation piece, and alleviate the adverse effect of an abrupt thickness change on strength.

In some embodiments, the thickness of the connecting portion is less than the thickness of the first insulation portion. Controlling the thickness of the connecting portion of the second insulation portion to be less than the thickness of the first insulation portion can minimize the space occupied in the shell by the second insulation portion, and reduce the capacity loss of the battery.

In some embodiments, the thickness of the connecting portion is equal to the thickness of the first insulation portion. The thickness of the connecting portion being equal to the thickness of the first insulation portion is conducive to integral molding, and reduces manufacturing time. The equal thickness of the two portions is also conducive to ensuring high structural strength at the joint between the two portions.

In some embodiments, the electrode post includes an electrode post body, and a first fixing portion and a second fixing portion located at two ends of the electrode post body respectively. The first fixing portion is located on one side of the first end wall, the side facing the electrode assembly. The second fixing portion is located on one side of the first end wall, the side facing away from the electrode assembly. The first end wall is provided with a mounting through-hole. The electrode post body is at least partially accommodated in the mounting through-hole. The first fixing portion and the second fixing portion are configured to clamp a part of the first end wall. The battery cell further includes a current collecting component. The current collecting component is at least partially located between the first tab and the first fixing portion, and is electrically connected to the first tab and the first fixing portion separately. Apart of the first insulation portion is located between the first fixing portion and the first end wall. In these embodiments, a clamping force can be provided to the first insulation portion, thereby implementing more reliable insulation, and making the internal structure of the battery more compact, and in turn, reducing the space occupation in the battery shell and the loss of capacity density.

In some embodiments, the electrode assembly further includes a main portion. The first tab is connected to the main portion. The main portion includes an active material region and an insulation region. The insulation region is located between the active material region and the first tab. The insulation region can reduce the risk of short circuits caused by burrs, and can also prevent short circuits caused by a lap-point between a positive electrode and a negative electrode, reduce direct contact between a positive electrode material and an electrolyte solution in the battery, and improve battery performance.

In some embodiments, along a direction from the first end wall to the electrode assembly, the connecting portion does not extend beyond one end of the insulation region, the end being close to the first end wall. In these embodiments, the relatively thick connecting portion in the second insulation portion is enabled to avoid the insulation region, thereby alleviating the squeezing action of the second insulation portion on the electrode assembly when the second insulation portion is disposed between the electrode assembly and the sidewall, and reducing the loss of capacity density.

In some embodiments, along a thickness direction of the first end wall, a length $h1$ of the connecting portion, a thickness $t1$ of the first fixing portion, a thickness $t2$ of the current collecting component, and a height $t3$ of the first tab satisfy: $h1 \leq t1+t2+t3$. This design makes the connecting portion staggered from the main portion of the electrode assembly, alleviates the squeezing action of the second insulation portion on the electrode assembly, and reduces the loss of capacity density.

In some embodiments, along a direction from the first end wall to the electrode assembly, the guide portion does not extend beyond one end of the insulation region, the end being close to the active material region. In these embodiments, the guide portion is caused to be staggered from the active material region, thereby alleviating the squeezing action of the second insulation portion on the active material region of the main portion of the electrode assembly, and reducing the loss of capacity density.

In some embodiments, along a thickness direction of the first end wall, a length $h1$ of the connecting portion, a length $h2$ of the guide portion, a thickness $t1$ of the first fixing portion, a thickness $t2$ of the current collecting component, a height $t3$ of the first tab, and a height $w$ of the insulation region satisfy: $h1+h2 \leq t1+t2+t3+w$. In these embodiments, the connecting portion and the guide portion can be staggered from the active material region of the main portion, thereby alleviating the squeezing action of the second insulation portion on the active material region, and reducing the loss of capacity density.

In some embodiments, a receptacle is formed on one side of the first insulation portion, the side facing the electrode assembly. The first fixing portion of the electrode post is at least partially accommodated in the receptacle. The receptacle for accommodating the first fixing portion makes the component layout more compact in the battery, utilizes the internal space of the shell efficiently, and increases the capacity of the battery.

In some embodiments, along a thickness direction of the first end wall, a depth of the receptacle is less than or equal to a thickness of the first fixing portion. The first fixing portion protrudes from the receptacle, thereby facilitating connection with the current collecting component. The first fixing portion can provide a supporting force for the current collecting component, and alleviate deformation of the current collecting component during welding and use.

In some embodiments, along a direction from the first end wall to the electrode assembly, the connecting portion does not extend beyond one end of the insulation region, the end being close to the first end wall. In these embodiments, the relatively thick connecting portion in the second insulation portion is enabled to avoid the insulation region, thereby alleviating the squeezing action of the second insulation portion on the electrode assembly when the second insulation portion is disposed between the electrode assembly and the sidewall, and reducing the loss of capacity density.

In some embodiments, along a thickness direction of the first end wall, a depth $h0$ of the receptacle, a length $h1$ of the connecting portion, a thickness $t1$ of the first fixing portion, a thickness $t2$ of the current collecting component, and a height $t3$ of the first tab satisfy: $h1 \leq t1+t2+t3-h0$. In these embodiments, the relatively thick connecting portion in the second insulation portion is enabled to avoid the insulation region, thereby alleviating the squeezing action of the second insulation portion on the electrode assembly when the second insulation portion is disposed between the electrode assembly and the sidewall, and reducing the loss of capacity density.

In some embodiments, along a direction from the first end wall to the electrode assembly, the guide portion does not extend beyond one end of the insulation region, the end being close to the electrode assembly. In these embodiments, the guide portion is caused to be staggered from the active material region, thereby alleviating the squeezing action of the second insulation portion on the active material region of the main portion of the electrode assembly, and reducing the loss of capacity density.

In some embodiments, along a thickness direction of the first end wall, a depth $h0$ of the receptacle, a length $h1$ of the connecting portion, a length $h2$ of the guide portion, a thickness $t1$ of the first fixing portion, a thickness $t2$ of the current collecting component, a height $t3$ of the first tab, and a height $w$ of the insulation region satisfy: $h1+h2 \leq t1+t2+t3+w-h0$. In these embodiments, the positions of the connecting portion and the guide portion can be arranged to avoid the position of the active material region of the electrode assembly, thereby minimizing the squeezing action of the insulation piece on the active material region and the space occupied by the insulation piece in the shell, and reducing the loss of capacity density.

In some embodiments, a thickness $t1$ of the first fixing portion along a first direction satisfies $0.4\ mm \leq t1 \leq 1.2\ mm$. The reasonable value of the height of the first fixing portion contributes to efficiently utilizing the volume space in the shell, reducing unnecessary capacity loss, and increasing the capacity of the battery.

In some embodiments, a thickness $t2$ of the current collecting component along the first direction satisfies $0.2\ mm \leq t2 \leq 0.6\ mm$. The appropriate height selected can achieve a good trade-off between the flow capacity of the current collecting component and the loss of capacity and mass of the battery, thereby improving the overall performance of the battery.

In some embodiments, a height $t3$ of the first tab along the first direction satisfies $0.5\ mm \leq t3 \leq 1.5\ mm$. The reasonably selected height $t3$ of the first tab makes the structural layout more rational in the shell of the battery, and improves the capacity and performance of the battery.

In some embodiments, a length $h1$ of the connecting portion of the insulation piece along the first direction satisfies $0 < h1 \leq 3.3\ mm$. The connecting portion can reduce the manufacturing cost. An appropriate length of the connecting portion can reduce the adverse effect caused by the insulation piece to other components in the shell of the battery.

In some embodiments, a length h2 of the guide portion of the insulation piece along the first direction satisfies 1 mm≤h2≤8.5 mm. The appropriate length of the guide portion selected can prevent the battery performance from being impaired by a large squeezing force on the active material coating on the electrode plate.

In some embodiments, the second insulation portion further includes an extension portion. The extension portion is connected to one end of the guide portion, the end being away from the connecting portion. A thickness of the extension portion is less than or equal to a minimum thickness of the guide portion. The extension portion is at least partially located between the active material region and the sidewall. The extension portion of the smallest thickness is disposed at one end of the second insulation portion, the end being away from the first insulation portion. At least a part of the extension portion is arranged between the active material region and the sidewall, thereby forming more reliable physical insulation and reducing the risk of short circuits inside the battery. The extension portion can also limit the position of the electrode assembly in the shell, thereby improving the stability and reliability of the internal structure of the battery.

In some embodiments, the thickness b1 of the connecting portion satisfies: 0.2≤mm≤b1≤1 mm, and the thickness b3 of the extension portion satisfies: 0.02 mm≤b3≤0.1 mm. In this way, the thickness of the connecting portion and the thickness of the extension portion can be reasonably selected according to the dimensional requirements of each component in the battery, thereby implementing reliable insulation and minimizing capacity loss.

In some embodiments, a length h3 of the extension portion along the first direction satisfies 0<h3≤7 mm. The extension portion of an appropriate length selected can implement reliable insulation between the electrode assembly and the shell.

In some embodiments, the shell is cylindrical; the outer edge of the first insulation portion is circular, and an outer diameter of the second insulation portion is less than or equal to an inner diameter of the sidewall of the shell. The outer diameter of the second insulation portion being set to be less than or equal to the inner diameter of the sidewall makes it convenient to fit the insulation piece into the shell, and reduces the difficulty of assembling.

In some embodiments, the outer diameter of the second insulation portion increases gradually along a direction away from the first insulation portion. The flaring opening can implement a closer fit between the second insulation portion and the inner surface of the sidewall of the shell, reduce the capacity loss caused by a clearance between the second insulation portion and the sidewall, and facilitate the assembling in the battery.

In some embodiments, the second insulation portion includes a connecting portion and a guide portion disposed in sequence along a direction away from the first insulation portion. An outer diameter D1 of the connecting portion at a junction between the connecting portion and the guide portion, an outer diameter D2 of the guide portion at one end away from the connecting portion, and an inner diameter D of the shell satisfy: D1≤D2≤D. By setting an appropriate numerical relationship between the outer diameter of the connecting portion and the outer diameter of the guide portion, the insulation piece can be smoothly put into the shell. At the same time, the flaring opening of the second insulation portion is more suitable for closely fitting the inner side of the shell, thereby avoiding interference with the electrode assembly and the consequent damage to the electrode assembly.

In some embodiments, the second insulation portion further includes an extension portion. The extension portion is located at one end of the guide portion, the end being away from the connecting portion. An outer diameter D3 of the extension portion at one end away from the guide portion satisfies: D1≤D2≤D3≤D. The outer diameters of the connecting portion, guide portion, and extension portion of the second insulation portion at the end away from the first insulation portion increase stepwise, thereby making it convenient to fit the insulation piece into the shell and avoid interference with the electrode assembly.

In some embodiments, the inner diameter D of the sidewall of the shell satisfies: 44.8 mm≤D≤45.5 mm. The outer diameter D1 of the connecting portion at the junction between the connecting portion and the guide portion satisfies: 43.5 mm K D1≤45.5 mm. The outer diameter D2 of the guide portion at one end away from the connecting portion satisfies: 44.5 mm≤D2≤45.5 mm. The outer diameter D3 of the extension portion at one end away from the guide portion satisfies: 44.7 mm≤D3 K 45.5 mm. The outer diameters of different parts of the second insulation portion are selected reasonably according to the inner diameter of the shell of the battery, thereby optimizing the structural layout in the shell and reducing the difficulty of assembling.

In some embodiments, the first insulation portion includes a second through-hole, and a groove located on a first side and surrounding the second through-hole. The electrode post passes through the second through-hole so that the first fixing portion is accommodated in the groove. By disposing the groove for accommodating the first fixing portion, this application can efficiently utilize the internal space of the shell, reduce the space occupied by a component other than an electrode plate in the shell, and increase the capacity of the battery.

In some embodiments, the insulation piece further includes at least one boss. The at least one boss is located on a first side of the first insulation portion, and is configured to abut the current collecting component. The boss can abut the surface of the current collecting component, so as to provide a supporting force for the current collecting component, and in turn, alleviate the deformation of the current collecting component under stress.

In some embodiments, the at least one boss, the first insulation portion, and the second insulation portion are injection-molded in one piece. The one-piece injection molding can form an insulation piece with a complex surface in a single pass, thereby reducing the workload of secondary processing of components, and reducing the manufacturing cost.

In some embodiments, the insulation piece is connected to an inner surface of the shell by adhesive bonding, thereby simplifying the assembling of the insulation piece, and improving the reliability of insulation.

In some embodiments, at least one notch is provided at one end of the second insulation portion, the end being away from the first insulation portion. The notch can provide deformation space for the operation of putting the insulation piece into the shell and the operation of mounting a tab, thereby releasing stress and reducing the difficulty of assembling.

According to a second aspect, an embodiment of this application provides a battery. The battery includes the battery cell disclosed in the above embodiment.

According to a third aspect, an embodiment of this application provides an electrical device. The electrical device includes the battery disclosed in the above embodiment. The battery is configured to provide electrical energy.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

Unless otherwise specified, the same reference numerals throughout a plurality of drawings represent the same or similar components or elements. The drawings are not necessarily drawn to scale. Understandably, the drawings merely depict some embodiments of this application, but are not to be intended as any limitation on the scope of this application.

Figure 1:
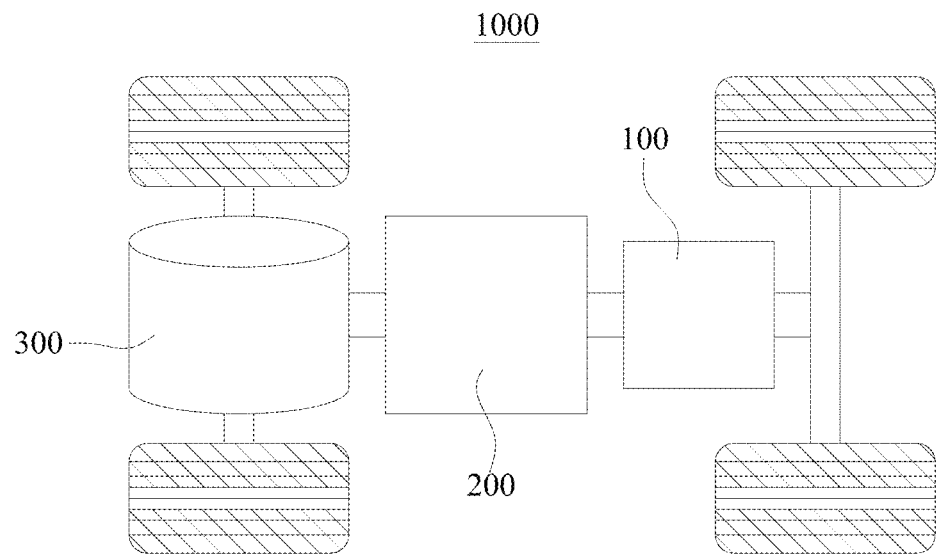
FIG. 1 is a schematic structural diagram of a vehicle according to some embodiments of this application.

LIST OF REFERENCE NUMERALS vehicle 1000;
battery 100, controller 200, motor 300;
box 10, first part 11, second part 12;
battery cell 20, shell 21, sidewall 211, first end wall 212, electrode assembly 22, first tab 221, main portion 222, active material region 2221, insulation region 2222, current collecting component 23, insulation piece 24, first insulation portion 241, first through-hole 2411, receptacle 2412, boss 2413, second insulation portion 242, connecting portion 2421, guide portion 2422, extension portion 2423, notch 243, electrode post 25, first fixing portion 251, electrode post body 252, second fixing portion 253, end cap 26, first direction X, second direction Y.

DETAILED DESCRIPTION

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of some embodiments of this application, the technical terms "first" and "second" are merely intended to distinguish between different items but not intended to indicate or imply relative importance or implicitly specify the number of the indicated technical features, specific order, or order of precedence. In the description of some embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the expansion of the application fields of the power batteries.

The applicant hereof has noticed that, when an electrode assembly of a battery is electrically connected to an electrode lead-out structure, a negative tab of the electrode assembly is electrically connected to a shell of the battery through a current collecting component, and a positive tab of the electrode assembly is electrically connected to the electrode post through the current collecting component. In order to avoid a short circuit, it is necessary to avoid contact between the positive tab of the battery and the shell when connecting the positive tab to the electrode post.

To avoid a short-circuit problem, an insulation piece may be disposed between a connection structure and the shell, where the connection structure is electrically connected to the positive electrode. For example, an insulation adhesive is applied between the electrode assembly and the shell, and the excess insulation adhesive is smoothed out. However, when the insulation is implemented by adhesive bonding, the edge of the insulation adhesive may warp up, resulting in insulation failure. Moreover, this insulation method incurs low production speed, and impairs the production efficiency of products.

Based on the above considerations, in order to solve the problem of unreliable insulation between the positive electrode of the battery and the shell, after in-depth research, the applicant has designed an insulation piece for use in a battery cell. The insulation piece includes a first insulation portion and a second insulation portion. The second insulation portion is peripherally disposed at an outer edge of the first insulation portion and protrudes toward one side. The insulation piece is arranged inside the shell of the battery. The first insulation portion is located between the first end wall of the shell and the first tab of the electrode assembly. At least a part of the second insulation portion is located between the first tab of the electrode assembly and the sidewall of the shell. The first insulation portion and the second insulation portion are arranged between the first tab and the shell from different directions, thereby isolating the electrode lead-out portions of different polarities of the battery cell, reducing the risk of short-circuit connection in the battery cell, and improving the reliability of the battery.

The arranged insulation piece occupies some accommodation space in the shell of the battery, thereby reducing the capacity of the battery or even interfering with a main region of the electrode plate, and in turn, squeezing the electrode assembly, causing excessive local stress on the electrode plate, and giving rise to undesirable loss (such as lithium plating). By further optimizing the structural form and dimensions of the insulation piece, the applicant hereof makes the insulation piece well adaptable to the layout and space inside the shell, thereby fully exerting the insulation effect, and reducing the adverse effects on other components such as the electrode assembly.

The battery cell disclosed in embodiments of this application is applicable to, but not limited to use in, electrical devices such as a vehicle, watercraft, or aircraft. A power supply system of the electrical devices may be formed by using the battery cell, the battery, and the like disclosed herein, so as to improve the reliability of insulation between the electrode lead-out portions of different polarities in the battery.

An embodiment of this application provides an electrical device powered by a battery. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as game console, electric car toy, electric ship toy, electric airplane toy, and the like. The spacecraft may include airplane, rocket, space shuttle, spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a driving power supply of the vehicle 1000 to provide driving power for the vehicle 1000 in place of or partly in place of fuel oil or natural gas.

Figure 2:
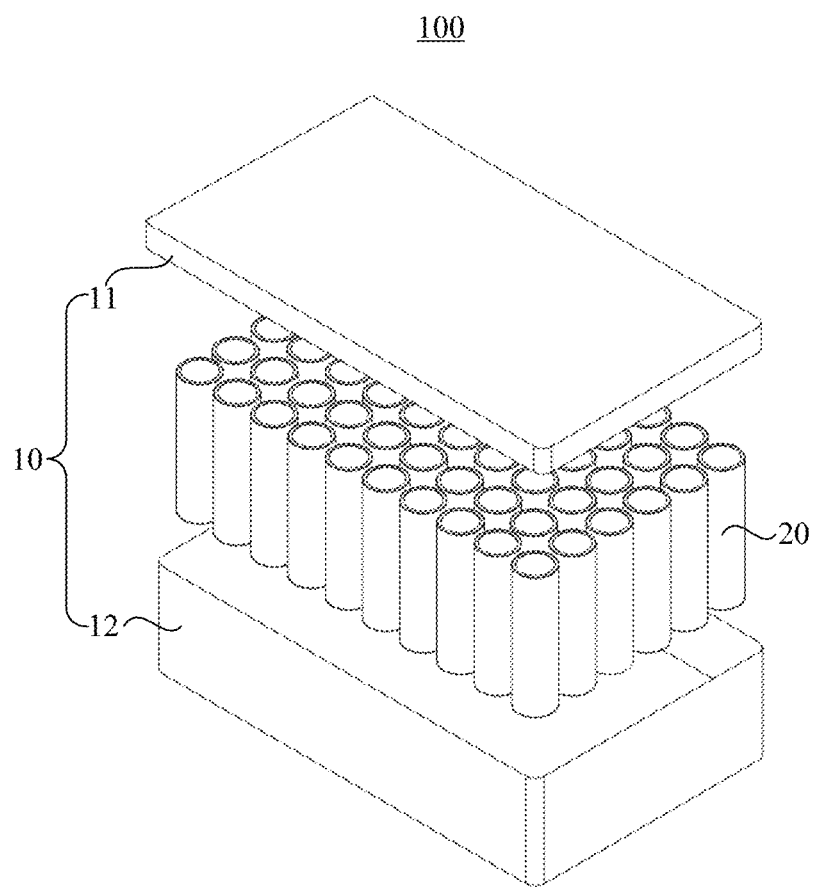
FIG. 2 is a schematic exploded view of a battery according to some embodiments of this application.

Referring to FIG. 2, FIG. 2 is an exploded view of a battery 100 according to some embodiments of this application. The battery 100 includes a box 10 and a battery cell 20. The battery cell 20 is accommodated in the box 10. The box 10 is configured to provide an accommodation space for the battery cell 20. The box 10 may be in various structures. In some embodiments, the box 10 may include a first part 11 and a second part 12. The first part 11 and the second part 12 fit and cover each other. The first part 11 and the second part 12 together define an accommodation space configured to accommodate the battery cell 20. The second part 12 may be a hollow structure opened at one end. The first part 11 may be a plate-like structure. The first part 11 fits the opening of the second part 12 so that the first part 11 and the second part 12 together define the accommodation space. Alternatively, both the first part 11 and the second part 12 may be hollow structures opened at one side. The opening of the first part 11 fits the opening of the second part 12. Definitely, the box 10 formed by the first part 11 and the second part 12 may be in various shapes, such as a cylinder or a cuboid.

The battery 100 may contain a plurality of battery cells 20. The plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, to make up a battery 100, the plurality of battery cells 20 may be connected in series, parallel, or series-and-parallel pattern to form a battery module first, and then a plurality of battery modules are connected in series, parallel, or series-and-parallel pattern to form a whole and accommodated in the box 10. The battery 100 may further include other structures. For example, the battery 100 may further include a busbar component. The busbar component is configured to implement electrical connection between the plurality of battery cells 20.

Each battery cell 20 may be, but is not limited to, a secondary battery or primary battery; or, may be a lithium-sulfur battery, a sodium-ion battery, or a magnesium-ion battery. The battery cell 20 may be in a shape such as a cylinder, a flat body, a cuboid, or other shapes.

Figure 3:
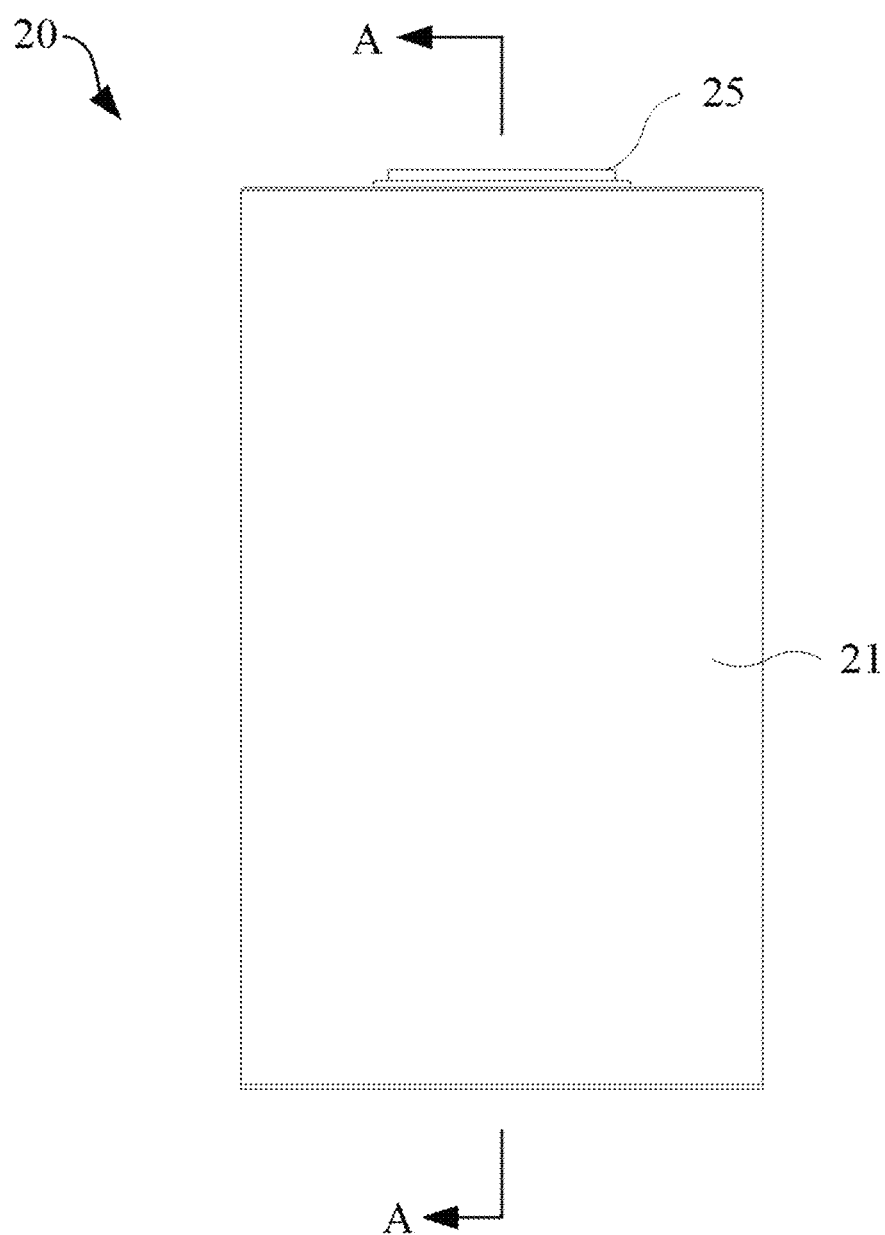
FIG. 3 is a front view of a battery cell according to some embodiments of this application.
Figure 4:
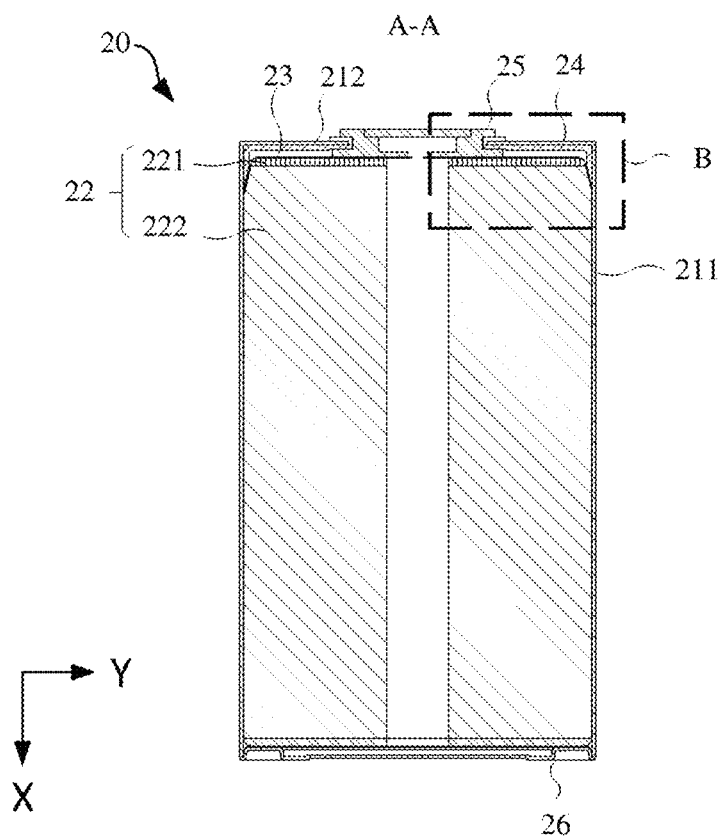
FIG. 4 is a cross-sectional view of the battery cell shown in FIG. 3 and sectioned along an A-A direction.
Figure 5:
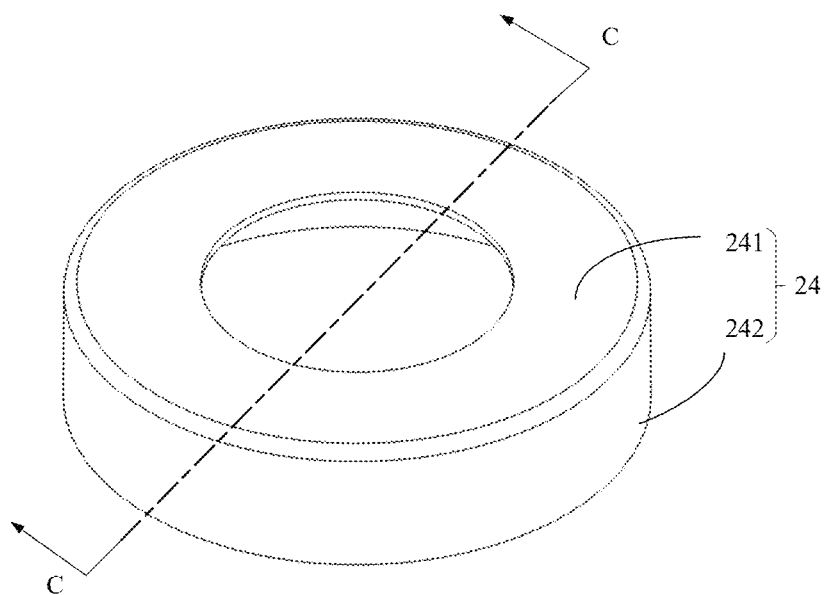
FIG. 5 is a three-dimensional view of an insulation piece according to some embodiments of this application.

Referring to FIG. 3 to FIG. 5, FIG. 3 is a schematic exploded view of a battery cell 20 according to some embodiments of this application; FIG. 4 is a cross-sectional view of the battery cell 20 shown in FIG. 3 and sectioned along an A-A direction; and FIG. 5 is a three-dimensional view of an insulation piece 24 according to some embodiments of this application. The battery cell 20 is a minimum unit of a battery. As shown in FIG. 3 and FIG. 4, the battery cell 20 includes a shell 21, an electrode assembly 22, an insulation piece 24, and an electrode post 25. The shell 21 includes a sidewall 211 and a first end wall 212 connected to the sidewall. The electrode post 25 is dielectrically mounted on the first end wall 212 of the shell 21. The electrode assembly 22 is located in the shell 21. The electrode assembly 22 includes a first tab 221 and a main portion connected to the first tab. The first tab 221 faces the first end wall 212 and is electrically connected to the electrode post 25. The insulation piece 24 includes a first insulation portion 241 and a second insulation portion 242. The second insulation portion 242 is peripherally disposed at an outer edge of the first insulation portion 241 and protrudes toward a side at which the electrode assembly 22 is located. The first insulation portion 241 is located between the first end wall 212 and the first tab 221. At least a part of the second insulation portion 242 is located between the first tab 221 and the sidewall 211.

The shell 21 is a component configured to form an internal environment of the battery cell 20. The formed internal environment may be used to accommodate the electrode assembly 22, an electrolyte solution, and other components. The shell 21 includes a sidewall 211 and a first end wall 212 located at one end of the sidewall 211. The first end wall 212 may be formed together with the sidewall 211 in one piece. An opening is formed at one end of the sidewall 211, the end being away from the first end wall 212. The opening allows placement of the electrode assembly 22 into the shell 21. Alternatively, the first end wall 212 may be an end cap that is manufactured separately from the sidewall 211 and configured to fit and cover the opening of the sidewall 211. Understandably, the shell 21 may further include a second end wall. The second end wall and the first end wall 212 are disposed opposite to each other and located at two ends of the sidewall 211 respectively. The shell 21 may vary in shape and size. For example, the shell assembly is cuboidal, cylindrical, hexagonal prismatic, or the like. Specifically, the shape of the shell 21 may depend on the specific shape and size of the electrode assembly 22. The shell 21 may be made of a variety of materials such as copper, iron, aluminum, stainless steel, aluminum alloy, or plastic, and the materials are not particularly limited herein.

The electrode assembly 22 is a component in which electrochemical reactions occur in the battery cell 20. One or more electrode assemblies 22 may be included in the shell 21. The electrode assembly 22 is typically formed of a positive electrode plate and a negative electrode plate that are wound or stacked together. Generally, a separator is disposed between the positive electrode plate and the negative electrode plate. The parts, coated with an active material, of the positive electrode plate and the negative electrode plate, constitute a body portion of the electrode assembly. The part, coated with no active material, of the positive electrode plate and the negative electrode plate separately, constitutes a tab. The positive tab and the negative tab may be located at one end of the body portion together or at two ends of the body portion respectively. In a charge-and-discharge process of the battery, the positive active material and the negative active material react with an electrolyte solution. The tabs are connected to electrode terminals to form a current circuit. The first tab 221 is formed at one end close to the first end wall 212. In an example, the first tab 221 may be a positive tab. The first tab 221 is electrically connected to the electrode post 25.

The electrode post 25 is an electrode terminal electrically connected to the first tab 221. The electrode post 25 runs through the first through-hole on the end wall 212, so as to be electrically connected to the first tab 221 in the shell 21. The electrode post 25 is dielectrically connected to the end wall 212 to prevent a short circuit from occurring when the shell 21 is electrically connected to the negative tab.

The insulation piece 24 may be made of various materials such as rubber or plastic. The shape of the insulation piece 24 may be designed according to the layout and space in the shell 21 to include a first insulation portion 241 and a second insulation portion 242. The first insulation portion 241 may be flat plate-shaped and contain a first side and a second side disposed opposite to each other. The second side is configured to abut the inner surface of the first end wall 212, so that the first insulation portion 241 can be sleeved in the shell 21 to maintain the insulation between the first end wall 212 of the shell 21 and the first tab 221. The second insulation portion 242 protrudes from the first side toward a side at which the electrode assembly 22 is located, so that at least a part of the second insulation portion 242 is located between the first tab 221 of the electrode assembly 22 and the sidewall 211 of the shell 21 to implement insulation between the first tab and the sidewall.

According to an embodiment of this application, an insulation piece 24 that matches the shape of the shell is disposed in the shell 21. The insulation piece 24 includes a first insulation portion 241 and a second insulation portion 242. The first insulation portion 241 is located between the first tab 221 and the first end wall 212. At least a part of the second insulation portion 242 is located between the first tab 221 and the sidewall 211, thereby being able to insulate the first tab 221 from the shell 21 from different directions, and reducing the probability of a short circuit inside the battery.

Figure 6:
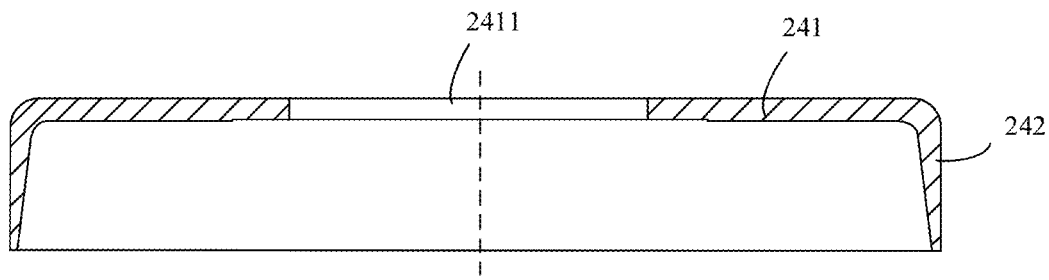
FIG. 6 is a cross-sectional view of an insulation piece sectioned along a C-C direction according to some embodiments of this application.

FIG. 6 is a cross-sectional view of the insulation piece 24 shown in FIG. 5 and sectioned along a C-C direction. In some embodiments, as shown in FIG. 6, the second insulation portion 242 includes a guide portion 2422. The guide portion 2422 is located at one end of the second insulation portion 242, the end being away from the first insulation portion 241. Along a direction away from the first insulation portion 241, an inner surface of the guide portion 2422 is inclined closer to the sidewall 211.

The second insulation portion 242 forms an opening at one end away from the first insulation portion 241. The guide portion 2422 is one end, away from the first insulation portion 241, of the second insulation portion 242, and is an end close to the opening. Along the direction away from the first insulation portion 241, the inner surface of the guide portion 2422 is inclined closer to the sidewall 211, meaning that the opening formed by the second insulation portion flares out gradually. At least a part of the second insulation portion 242 is located between the sidewall 211 of the shell 21 and the electrode assembly 22. During assembling, a part of the first tab 221 of the electrode assembly 22 needs to be extended into the opening formed by the second insulation portion 242 to implement the electrical connection between the first tab 221 and the electrode post 25, so that at least a part of the guide portion 2422 is located between the first tab 221 and the sidewall 211.

Along the direction away from the first insulation portion 241, the inner surface of the guide portion 2422 is inclined closer to the sidewall 211, thereby making it easier for the first tab 221 of the electrode assembly 22 to enter the accommodation cavity defined by the second insulation portion 242 during assembling. At the same time, the inclined inner surface of the guide portion 2422 can also apply a force to one end of the first tab 221, where the end is close to the first end wall 212. The force makes the first tab tucked toward the center of the battery, thereby facilitating electrical connection between the first tab 221 and the electrode post 25.

In some embodiments, the guide portion 2422 gradually tapers in thickness along the direction away from the first insulation portion 241.

The guide portion 2422 as a whole extends along the direction away from the first insulation portion 241, and the thickness of the guide portion 2422 means the dimension perpendicular to the extension direction thereof. In an embodiment, the second insulation portion 242 may extend along a direction perpendicular to the plane in which the first insulation portion 241 is located, and the thickness of the guide portion 2422 is the thickness along a direction parallel to the plane in which the first insulation portion 241 is located.

The insulation piece 24 is disposed inside the shell 21, thereby occupying some space inside the shell, and reducing the capacity density of the battery. The guide portion 2422 that tapers in thickness can improve the utilization of the space in the shell 21.

Figure 7:
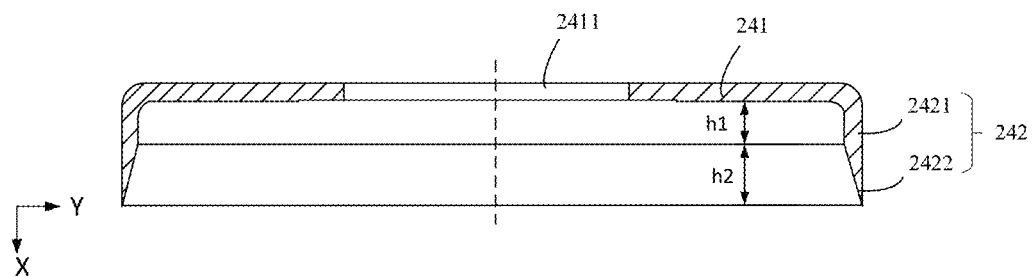
FIG. 7 is a cross-sectional view of an insulation piece sectioned along a C-C direction according to some other embodiments of this application.

FIG. 7 is a cross-sectional view of the insulation piece 24 shown in FIG. 5 and sectioned along a C-C direction according to some other embodiments of this application. As shown in FIG. 7, in some embodiments, the second insulation portion 242 includes a connecting portion 2421. Two ends of the connecting portion 2421 are connected to the first insulation portion 241 and the guide portion 2422 respectively. The thickness of the connecting portion 2421 is greater than or equal to the maximum thickness of the guide portion 2422.

The connecting portion 2421 is connected to the first insulation portion 241 through a chamfered or filleted transition. The connecting portion 2421 is closer to the first end wall 212, and the end, close to the first end wall 212, of the first tab 221 tends to be tucked toward the center to enable electrical connection with the electrode post 25. Therefore, the region in which the connecting portion 2421 is located is less sensitive to the thickness of the second insulation portion than the region in which the guide portion 2422 is located. The thickness of the connecting portion 2421 may be uniform or variable. Specifically, the minimum thickness of the connecting portion 2421 may be greater than or equal to the maximum thickness of the guide portion 2422.

That the thickness of the connecting portion 2421 is greater than or equal to the maximum thickness of the guide portion 2422 facilitates the manufacture and processing of the insulation piece 24, and reduces the difficulty of manufacture and processing caused by excessive thinness. On the other hand, the relatively small thickness of the guide portion 2422, closer to the electrode assembly 22, of the second insulation portion 242 can reduce the space occupied in the shell 21, and alleviate the compression deformation caused by the second insulation portion 242 to the electrode assembly 22.

In some embodiments, a difference between the thickness of the connecting portion 2421 and the thickness of the first insulation portion 241 is less than or equal to 0.2 mm.

The thickness of the first insulation portion 241 means the thickness of the first insulation portion 241 along a direction perpendicular to the first end wall 212. The thickness of the connecting portion 2421 means the thickness along a direction perpendicular to the extension direction of the connecting portion 2421. The thickness of the connecting portion 2421 may be constant or variable. The first insulation portion 241 and the second insulation portion 242 may be injection-molded in one piece, or may be manufactured separately and then connected together. Understandably, the second insulation portion 242 is a structure disposed peripherally along the edge of the first insulation portion 241. If the thickness of the second insulation portion is excessively small or the difference in thickness between the second insulation portion and the first insulation portion 241 is excessively large, great difficulties will be posed to the manufacture and processing. Especially, for the connecting portion 2421 at the joint, the large thickness difference makes it difficult to ensure desirable structural strength at the junction.

Controlling the difference in thickness between the connecting portion 2421 and the first insulation portion 241 to be less than or equal to 0.2 mm can avoid an excessive thickness difference between the first insulation portion 241 and the second insulation portion 242, especially the thickness difference at the joint, thereby facilitating the manufacture and processing of the insulation piece 24, and alleviating the adverse effect of an abrupt thickness change on strength.

In some embodiments, the thickness of the connecting portion 2421 is less than the thickness of the first insulation portion 241.

The size of the clearance between the electrode assembly 22 and the sidewall 211 of the shell 21 exerts a significant impact on the capacity of the battery. Controlling the thickness of the connecting portion 2421 of the second insulation portion 242 to be less than the thickness of the first insulation portion 241 can minimize the space occupied in the shell by the second insulation portion 242, and reduce the capacity loss of the battery.

In some embodiments, the thickness of the connecting portion 2421 is equal to the thickness of the first insulation portion 241.

The thickness of the connecting portion 2421 being equal to the thickness of the first insulation portion 241 is conducive to integral molding of the insulation piece 24 during preparation, and reduces manufacturing time. The equal thickness of the two portions is also conducive to ensuring high structural strength at the joint between the two portions.

Figure 8:
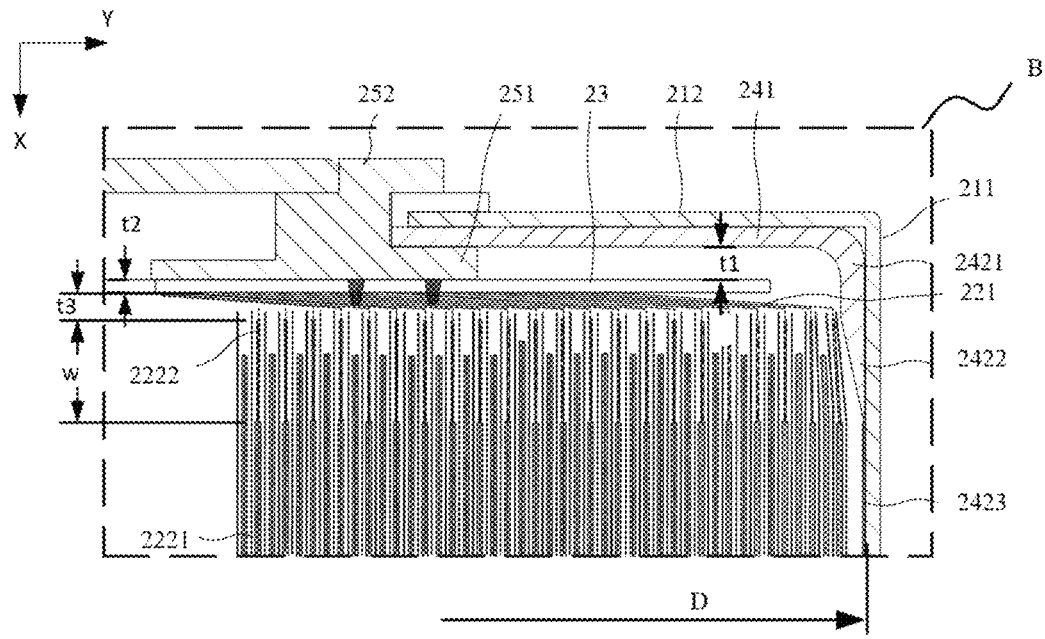
FIG. 8 is a close-up view of a part B shown in FIG. 4.

FIG. 8 is a close-up view of a part B shown in FIG. 4. In some embodiments, as shown in FIG. 8, the electrode post 25 includes an electrode post body 252, and a first fixing portion 251 and a second fixing portion 253 located at two ends of the electrode post body 252 respectively. The first fixing portion 251 is located on one side of the first end wall 212, the side facing the electrode assembly 22. The second fixing portion 253 is located on one side of the first end wall 212, the side facing away from the electrode assembly 22. The first end wall 212 is provided with a mounting through-hole. The electrode post body 252 is at least partially accommodated in the mounting through-hole. The first fixing portion 251 and the second fixing portion 253 are configured to clamp a part of the first end wall 212.

The battery cell further includes a current collecting component 23. The current collecting component 23 is at least partially located between the first tab 221 and the first fixing portion 251, and is electrically connected to the first tab 221 and the first fixing portion 251 separately. A part of the first insulation portion 241 is located between the first fixing portion 251 and the first end wall 212.

The first fixing portion 251 and the second fixing portion 253 are located at the two ends of the electrode post body 252 respectively and protrude beyond the electrode post body 252, so as to form a groove for clamping the first end wall 212. As shown in FIG. 8, in an example, the first fixing portion 251, the second fixing portion 253, and the electrode post body 252 may form a U-shaped groove. A mounting through-hole is provided on the first end wall 212. The first insulation portion 241 is provided with a first through-hole 2411 corresponding to the mounting through-hole. The shapes of the first through-hole 2411 and the mounting through-hole are adapted to the shape of the electrode post 25 to allow insertion of the electrode post 25 in the mounting through-hole. The sidewall, on which the mounting through-hole is formed, of the first end wall 212 is peripherally accommodated in the groove of the electrode post 25. A part, close to the mounting through-hole, of the first insulation portion 241 is located between the first fixing portion 251 and the first end wall 212, so that the first fixing portion 251 maintains insulative isolation when clamping the first end wall 212.

In an example, an insulation component may be disposed between the electrode post body 252 and the sidewall of the mounting through-hole of the first end wall 212, and between the second fixing portion 253 and one side of the first end wall 212, the side facing away from the electrode assembly 22, so as to maintain insulative connection and avoid a short circuit. For example, the cross-section of the insulation component may be L-shaped. The insulation component is sandwiched between the electrode post 25 and the first end wall 212, and works together with the insulation piece 24 to implement insulative connection between a conductive path and the shell 21, where the conductive path is formed by the electrode post 25 electrically connected to the first tab.

The current collecting component 23 is a component made of a conductive material such as copper and configured to collect current. After collecting the current generated in the electrode assembly 22, the current collecting component 23 is connected to an electrode terminal (such as the electrode post 25) to form a current loop. The current collecting component 23 is electrically connected to the first tab 221 of the electrode assembly 22 and the electrode post 25 separately. In an example, the current collecting component 23 is sandwiched between the first tab 221 and the first fixing portion 251 of the electrode post 25, and implements electrical connection by welding. The current collecting component 23 may be fixedly connected to the first tab 221 and the first fixing portion 251 by welding. Specifically, the welding may be laser welding, ultrasonic welding, resistance welding, or the like. Along the first direction X parallel to the axial direction of the electrode assembly 22, the first end wall 212, the first insulation portion 241, the first fixing portion 251, the current collecting component 23, and the first tab 221 are disposed in sequence.

In these embodiments, the electrode post 25 clamps the first end wall 212 by means of the first fixing portion 251 and the second fixing portion 253, and a part of the first insulation portion 241 is sandwiched between the first fixing portion 251 and the first end wall 212, so as to provide the first insulation portion 241 with a clamping force perpendicular to the first end wall 212. This arrangement prevents the insulation piece 24 from being offset or misaligned, implements more reliable insulation, and also reduces the clearance between the components along the first direction X, thereby making the internal structure of the battery more compact, and reducing the space occupation in the battery shell and the loss of capacity density.

In some embodiments, as shown in FIG. 8, the electrode assembly 22 further includes a main portion 222. The first tab 221 is connected to the main portion 222. The main portion 222 includes an active material region 2221 and an insulation region 2222. The insulation region 2222 is located between the active material region 2221 and the first tab 221.

The active material region 2221 is a region coated with an active material on the current collector of the electrode plate of the electrode assembly 22. The insulation region 2222 is a region coated with an insulation coating on the current collector of the electrode plate of the electrode assembly 22. The insulation coating may be a ceramic coating, such as an alumina ceramics coating. In an example, using a lithium-ion battery as an example, the active material region 2221 and the insulation region 2222 are located in a coated region of the positive electrode plate of the electrode assembly 22. The first tab 221 is located at one end of the coating region of the positive electrode plate, the end being close to the first end wall 212. To reduce the occurrence of undesirable losses (such as lithium plating), the active material region of the negative electrode plate fully overlays the active material region of the positive electrode plate during winding of the electrode plate of the battery, so as to receive as many lithium ions as possible that are deintercalated from the positive electrode and intercalated into the negative electrode. The insulation region 2222 is located between the active material region 2221 of the positive electrode and the first tab 221, so that the insulation coating in the insulation region 2222 can reduce the burrs on the surface. The insulation region 2222 is disposed corresponding to the excess active material region of the negative electrode plate.

The insulation region 2222 disposed between the active material region 2221 and the first tab 221 can reduce the risk of short circuits caused by the burrs, and reduce the probability of short circuits caused by a lap-joint between the positive electrode and the negative electrode. The insulation coating in the insulation region 2222 overlays the surface of the current collector to reduce the direct contact between the foil and the electrolyte solution in the battery, thereby improving the battery performance.

In some embodiments, along a direction from the first end wall 212 to the electrode assembly 22, that is, the first direction X, the connecting portion 2421 does not extend beyond one end of the insulation region 2222, the end being close to the first end wall 212.

The insulation region 2222 includes a first end close to the first end wall 212 and a second end close to the active material region 2221. The first end is connected to the first tab 221. The first tab 221 can be tucked or bent toward the center of the electrode assembly 22 and be connected to the current collecting component 23. Therefore, the region corresponding to the first end of the insulation region 2222 in the battery cell on a side close to the first end wall 212 is more tolerant of the thickness of the second insulation portion 242 than the region corresponding to the first end of the insulation region 2222 on a side close to the active material region 2221. Along the first direction X, the connecting portion 2421 does not extend beyond one end, close to the first end wall 212, of the insulation region 2222, meaning that the length of the connecting portion 2421 along the first direction X does not exceed the length from the first end of the insulation region 2222 to the first insulation portion 241. In other words, along the first direction X, the junction between the connecting portion 2421 and the guide portion 2422 is located on one side of the first end of the insulation region 2222, the side being close to the first end wall 212.

In these embodiments, the connecting portion 2421 is controlled not to extend beyond one end of the insulation region 2222 along the first direction X, the end being close to the first end wall 212. Therefore, the connecting portion 2421 that is relatively thick in the second insulation portion 242 can avoid the insulation region 2222, thereby alleviating the squeezing action of the second insulation portion 242 on the electrode assembly when the second insulation portion is disposed between the electrode assembly 22 and the sidewall 211, and reducing the loss of capacity density. In addition, the connecting portion 2421 avoids the insulation region 2222, so that the guide portion 2422 can be disposed corresponding to the first tab 221. In this way, the inclined inner surface of the guide portion 2422 can be utilized to tuck the first tab 221 toward the center, thereby facilitating the connection between the first tab 221 and the current collecting component 23.

In some embodiments, as shown in FIG. 7 to FIG. 8, along the first direction X, that is, the thickness direction of the first end wall 212, the length h1 of the connecting portion 2421, the thickness t1 of the first fixing portion 251, the thickness t2 of the current collecting component 23, and the height t3 of the first tab 221 satisfy: $h1 \leq t1+t2+t3$.

The surface of the first fixing portion 251 on one side away from the first tab 221 abuts the first side of the first insulation portion 241. The current collecting component 23 may be flat plate-shaped. The specific shape may be designed according to the shape of the battery cell and the connection position of the first tab. For example, the current collecting component may be a circular current collecting disc. The height t3 of the first tab 221 means a dimension of the first tab along the first direction X. When the first tab 221 is bent, the height t3 of the first tab 221 means the height of the first tab along the first direction X after the first tab is bent.

The length of the connecting portion 2421 is set to be less than the sum of the heights of the first fixing portion 251, the current collecting component 23, and the first tab 221. In this case, the connecting portion 2421 is disposed corresponding to the first fixing portion 251, the current collecting component 23, and the first tab 221. Such components impose a relatively low requirement on the space of the region close to the sidewall 211. The connecting portion 2421 is allowed to be thickness enough to meet the structural and processing requirements of the insulation piece 24, thereby avoiding low moldability caused by a deficient thickness. In addition, this arrangement makes the connecting portion 2421 staggered from the main portion 222 of the electrode assembly 22, thereby preventing the relatively thick connecting portion 2421 from occupying the space for arrangement of the main portion 222 in the shell 21, and reducing the capacity loss in the battery.

In some embodiments, as shown in FIG. 8, along a direction from the first end wall 212 to the electrode assembly 22, that is, the first direction X, the guide portion 2422 does not extend beyond one end of the insulation region 2222, the end being close to the active material region 2221.

The guide portion 2422 does not extend beyond one end of the insulation region 2222, the end being close to the active material region 2221, meaning that the length from one end, away from the first insulation portion 241, of the guide portion 2422 to the first end wall 212 along the first direction X is less than the length from one end, close to the active material region 2221, of the insulation region 2222 to the first end wall 212.

In these embodiments, the guide portion 2422 does not extend beyond one end of the insulation region 2222 along the first direction X, the end being close to the active material region 2221, so that the guide portion 2422 is caused to be staggered from the active material region 2221, thereby alleviating the squeezing action of the second insulation portion 242 on the active material region of the main portion 222 of the electrode assembly 22, and reducing the loss of capacity density.

In some embodiments, as shown in FIG. 8, along the thickness direction of the first end wall 212, that is, the first direction X, the length h1 of the connecting portion 2421, the length h2 of the guide portion 2422, the thickness t1 of the first fixing portion 251, the thickness t2 of the current collecting component 23, the height t3 of the first tab 221, and the height w of the insulation region 2222 satisfy: $h1+h2 \leq t1+t2+t3+w$.

The insulation region 2222 and the active material region 2221 are arranged in sequence along the first direction X. The insulation region 2222 is located on one side of the electrode plate, the side being close to the first end wall 212. The thickness of the insulation coating can be less than the thickness of the active material coating, so that the clearance between the plates at the position of the insulation region 2222 is larger than the clearance between the plates in the active material region 2221 and can accommodate the insulation piece 24 of a specified thickness without excessively stressing the electrode plates or causing excessive capacity loss.

The sum of the lengths of the connecting portion 2421 and the guide portion 2422 is less than the sum of the heights of the first fixing portion 251, the current collecting component 23, the first tab 221, and the insulation region 2222. In this way, the connecting portion 2421 and the guide portion 2422 can be staggered from the active material region 2221 of the main portion 222, thereby alleviating problems such as undesirable losses (such as lithium plating) caused by the second insulation portion 242 squeezing the active material region 2221 during cycling.

Figure 9:
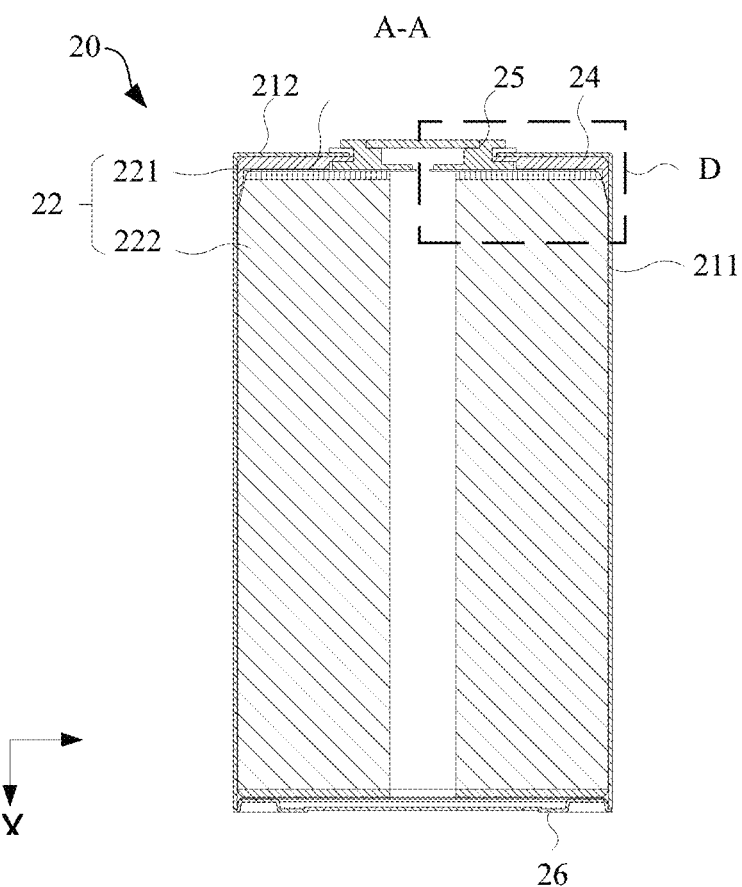
FIG. 9 is a cross-sectional view of sectioning along an A-A direction shown in FIG. 3 according to some other embodiments of this application.
Figure 10:
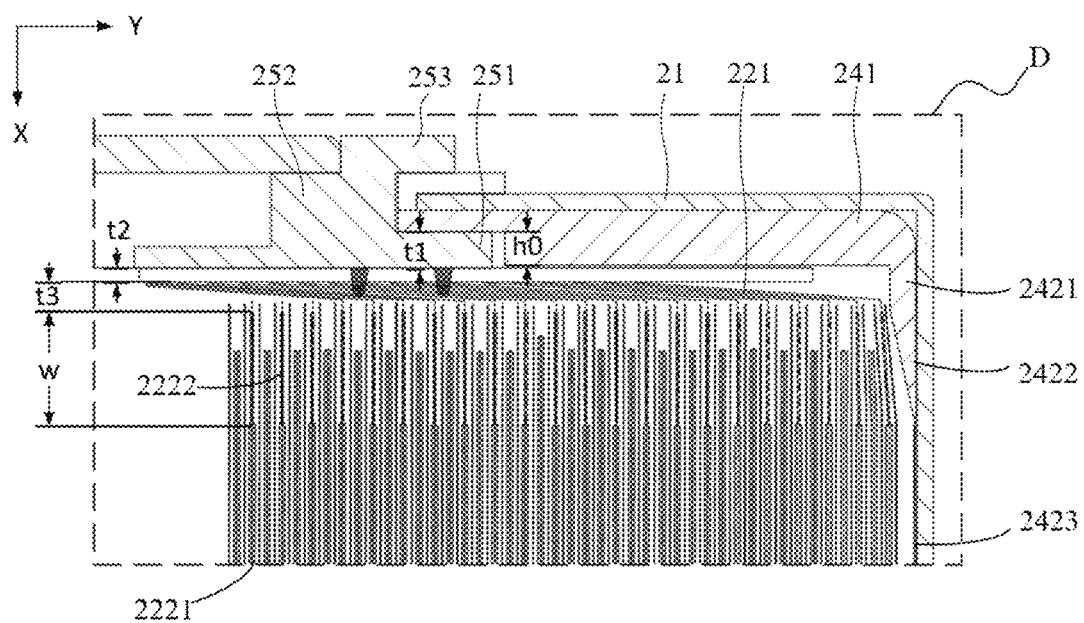
FIG. 10 is a close-up view of a part D shown in FIG. 9.
Figure 11:
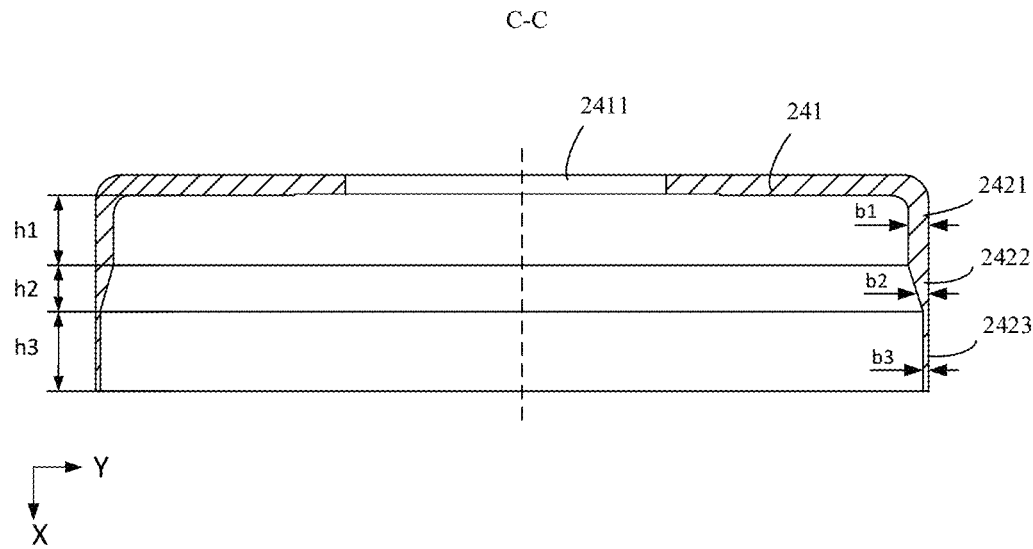
FIG. 11 is a cross-sectional view of an insulation piece sectioned along a C-C direction according to still some other embodiments of this application.
Figure 12:
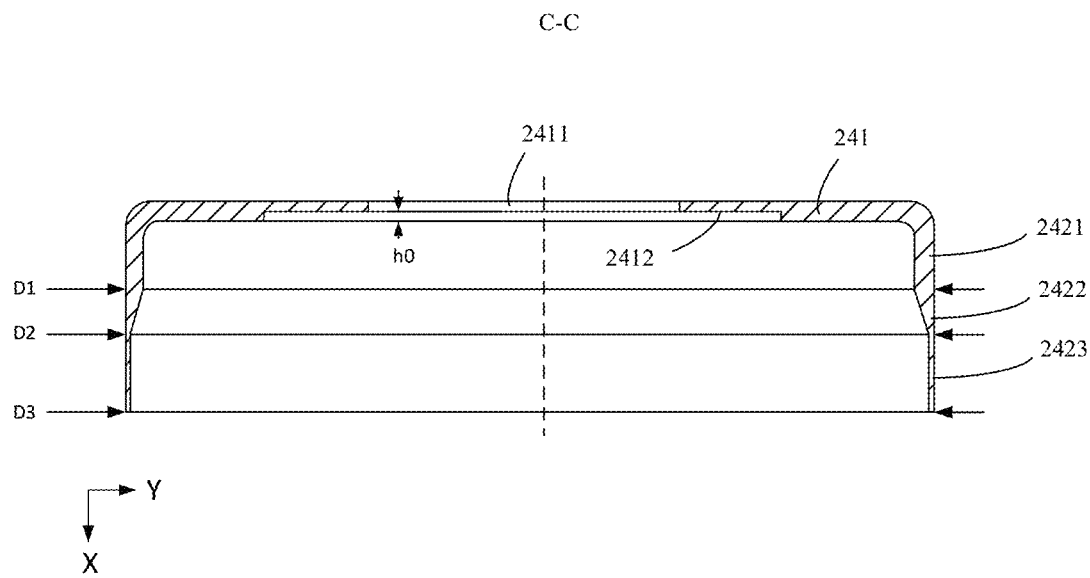
FIG. 12 is a cross-sectional view of an insulation piece sectioned along a C-C direction according to yet some other embodiments of this application.

FIG. 9 is a cross-sectional view of sectioning along an A-A direction shown in FIG. 3 according to some other embodiments of this application; and FIG. 10 is a close-up view of a part D shown in FIG. 9. FIG. 11 is a cross-sectional view of an insulation piece 24 sectioned along a C-C direction according to still some other embodiments of this application; and FIG. 12 is a cross-sectional view of the insulation piece 24 sectioned along the C-C direction according to yet some other embodiments of this application.

In some embodiments, as shown in FIG. 9 to FIG. 11, a receptacle 2412 is formed on one side of the first insulation portion 241, the side facing the electrode assembly 22. The first fixing portion 251 of the electrode post 25 is at least partially accommodated in the receptacle 2412.

The receptacle 2412 is located on the first side of the first insulation portion 241, the side facing the electrode assembly 22. The receptacle 2412 includes a bottom surface and a side surface disposed peripherally along the edge of the bottom surface. Relative to the first side, the bottom surface is recessed toward a side on which the first end wall 212 is located. In this way, the thickness of the first insulation portion 241 inside the receptacle 2412 is less than the thickness outside the receptacle 2412. The first fixing portion 251 may be at least partially accommodated in the receptacle 2412 and abut the bottom surface of the receptacle 2412 after being assembled.

In an example, the first insulation portion 241 and the first end wall 212 are provided with a mounting through-hole to allow the electrode post 25 to pass through, so as to lead the electrode out of the shell 21. The receptacle 2412 is disposed around the mounting through-hole, so that the mounting through-hole is located inside the receptacle 2412. For example, the mounting through-hole is located at the center of the receptacle 2412.

The receptacle 2412 for accommodating the first fixing portion 251 can reduce the space occupied by the first fixing portion 251 along the first direction X in the battery shell, make the component layout more compact in the battery, utilize the internal space of the shell 21 efficiently, and increase the capacity of the battery.

In some embodiments, as shown in FIG. 10, along the thickness direction of the first end wall 212, that is, along the first direction X, the depth h0 of the receptacle 2412 along the first direction X is less than or equal to the thickness t1 of the first fixing portion 251 along the first direction X, satisfying: $h0 \leq t1$.

The depth h0 of the receptacle 2412 along the first direction X means a height difference between the bottom surface of the receptacle 2412 and the first side of the first insulation portion 241 along the first direction X.

A surface of the first fixing portion 251 on one side abuts the bottom surface of the receptacle 2412, and a surface of the first fixing portion 251 on another side is electrically connected to the current collecting component 23. The current collecting component 23 is relatively large in size, and therefore, it is impracticable to dispose the current collecting component 23 in the receptacle 2412. When the depth h0 of the receptacle 2412 is greater than the thickness t1 of the first fixing portion 251, the first fixing portion 251 and the current collecting component 23 will be interspaced with a clearance and unable to contact each other closely, thereby making it difficult to connect the first fixing portion and the current collecting component together. For example, a cold solder joint or a solder skip may occur, impairing the reliability of the connection. The first fixing portion 251 protrudes from the receptacle 2412, thereby facilitating connection with the current collecting component 23. The first fixing portion can provide a supporting force for the current collecting component 23, and alleviate deformation of the current collecting component 23 during welding and use.

In some embodiments, along a direction from the first end wall 212 to the electrode assembly 22, that is, the first direction X, the connecting portion 2421 does not extend beyond one end of the insulation region 2222, the end being close to the first end wall 212.

When the receptacle 2412 is disposed on the first side of the first insulation portion 241, the connecting portion may be so arranged as not to extend beyond one end of the insulation region 2222 along the first direction X, the end being close to the first end wall 212, so as to be staggered from the insulation region 2222. The beneficial effects of these embodiments have been described in the previous embodiments, and are not repeated here.

In some embodiments, as shown in FIG. 10 and FIG. 11, along the thickness direction of the first end wall 212, that is, the first direction X, the depth h0 of the receptacle 2412, the length h1 of the connecting portion 2421, the thickness t1 of the first fixing portion 251, the thickness t2 of the current collecting component 23, and the height t3 of the first tab 221 satisfy: $h1 \leq t1+t2+t3-h0$.

When the receptacle 2412 is disposed on the first side of the first insulation portion 241, the depth h0 of the receptacle 2412, the length h1 of the connecting portion 2421, the thickness t1 of the first fixing portion 251, the thickness t2 of the current collecting component 23, and the height t3 of the first tab 221 are set to meet the above conditions, thereby enabling the connecting portion 2421 to avoid the main portion 222 of the electrode assembly 22, and in turn, preventing the large thickness of the connecting portion 2421 from squeezing the main portion 222 and from occupying the space inside the shell of the battery.

In some embodiments, as shown in FIG. 10, along a direction from the first end wall 212 to the electrode assembly 22, that is, the first direction X, the guide portion 2422 does not extend beyond one end of the insulation region 2222, the end being close to the active material region 2221.

In these embodiments, the guide portion 2422 does not extend beyond one end of the insulation region 2222 along the first direction X, the end being close to the active material region 2221, so that the guide portion 2422 is caused to be staggered from the active material region 2221, thereby alleviating the squeezing action of the second insulation portion 242 on the active material region of the main portion 222 of the electrode assembly 22, and reducing the loss of capacity density of the battery.

In some embodiments, as shown in FIG. 10 and FIG. 11, along the thickness direction of the first end wall 212, that is, the first direction X, the depth h0 of the receptacle 2412, the length h1 of the connecting portion 2421, the length h2 of the guide portion 2422, the thickness t1 of the first fixing portion 251, the thickness t2 of the current collecting component 23, the height t3 of the first tab 221, and the height w of the insulation region 2222 satisfy: $h1+h2 \leq t1+t2+t3+w-h0$.

By setting the sum of heights of the connecting portion 2421 and the guide portion 2422 to be less than or equal to the sum of heights of the first fixing portion 251, the current collecting component 23, the first tab 221, and the insulation region 2222 minus the depth of the receptacle 2412, the positions of the connecting portion 2421 and the guide portion 2422 can avoid the position of the active material region 2221 of the electrode assembly 22, thereby minimizing the squeezing action of the insulation piece on the active material region and the space occupied by the insulation piece, and reducing the loss of capacity density.

In some embodiments, as shown in FIG. 8, along the first direction X, the thickness t1 of the first fixing portion 251 satisfies: 0.4 mm≤t1≤1.2 mm.

In some embodiments, along the first direction X, the thickness t2 of the current collecting component 23 satisfies: 0.2 mm≤t2≤0.6 mm.

In some embodiments, along the first direction X, the height t3 of the first tab 221 satisfies: 0.5 mm≤t3≤1.5 mm.

In some embodiments, along the first direction X, the length h1 of the connecting portion 2421 satisfies: 0<h1≤3.3 mm.

In some embodiments, along the first direction X, the length h2 of the guide portion 2422 satisfies. 1 mm≤h2≤8.5 mm.

The thickness t1 of the first fixing portion 251, the thickness t2 of the current collecting component 23, the height t3 of the first tab 221 each mean a dimension along the first direction X. For example, when the first tab 221 is bent or squeezed, the height t3 of the first tab 221 means the dimension of the first tab along the first direction X after the first tab is bent or squeezed. The extension direction of the second insulation portion 242 is not limited to the direction perpendicular to the plane in which the first insulation portion 241 is located. Therefore, the length h1 of the connecting portion 2421 and the length h2 of the guide portion 2422 mean the lengths along the first direction X rather than the inherent lengths.

In the shell of the battery, the larger the size of other components, the smaller the space available to accommodate the electrode assembly, and the lower the capacity of the battery. The reasonable values of the height of the first fixing portion 251, the thickness of the current collecting component 23, the height of the first tab 221 contribute to efficiently utilizing the volume space in the shell 21, reducing unnecessary capacity loss, and increasing the capacity of the battery. Correspondingly, in order to achieve a desirable level of the reliability of the insulative connection and the capacity density of the battery, selecting appropriate length ranges of the connecting portion 2421 and the guide portion 2422 of the second insulation portion 242 makes the second insulation portion 242 more reasonably arranged between the electrode assembly 22 and the sidewall 211, thereby not only achieving the desired insulation effect, but also alleviating the squeezing action on the electrode plate and the loss of capacity.

In some embodiments, as shown in FIG. 10 and FIG. 11, the second insulation portion 242 further includes an extension portion 2423. The extension portion 2423 is connected to one end of the guide portion 2422, the end being away from the connecting portion 2421. The thickness of the extension portion 2423 is less than or equal to a minimum thickness of the guide portion 2422. The extension portion 2423 is at least partially located between the active material region 2221 and the sidewall 211.

The extension portion 2423 is located at one end away from the first insulation portion 241. The extension portion 2423 may form an opening that allows the electrode assembly to enter the shell and be electrically connected to the electrode post during assembling. The thickness of the guide portion 2422 is non-uniform, and the thickness of the extension portion 2423 is less than or equal to the minimum thickness of the guide portion 2422, thereby reducing the space occupation in the shell. At least a part of the extension portion 2423 may be disposed between the active material region 2221 of the main portion 222 and the sidewall 211 of the shell 21 to implement insulation in between.

To avoid space occupation in the electrode assembly, the insulation piece is usually not disposed between the active material region 2221 of the electrode assembly and the sidewall 211 of the shell 21, but the active material region 2221 of the electrode assembly is spaced apart from the sidewall 211 by relying on the separator and the end limit. However, such an arrangement is unable to reliably implement full insulation between the two components, especially when the separator is pierced or the shell of the battery is deformed, thereby still posing relatively high risk of short circuits. In these embodiments, the extension portion 2423 of the smallest thickness is further disposed at one end of the second insulation portion 242, the end being away from the first insulation portion 241. At least a part of the extension portion is arranged between the active material region 2221 and the sidewall 211, thereby forming more reliable physical insulation and reducing the risk of short circuits inside the battery. At the same time, the thickness of the extension portion 2423 may be set to the smallest possible value, so as to reduce the squeezing action on the electrode plate and the resultant capacity loss. In addition, the extension portion 2423 is disposed around the active material region 2221, thereby limiting the position of the electrode assembly in the shell, and improving the stability and reliability of the internal structure of the battery.

In some embodiments, as shown in FIG. 11, the thickness b1 of the connecting portion 2421 satisfies: 0.2 mm≤b1≤1 mm, and the thickness b3 of the extension portion 2423 satisfies: 0.02 mm≤b3≤0.1 mm.

The thickness b1 of the connecting portion 2421 and the thickness b3 of the extension portion 2423 mean the thickness along a direction perpendicular to the extension direction of the respective portions. In an example, the extension portion 2421 and the connecting portion 2423 both extend along the first direction X, and the corresponding thickness is the thickness along the second direction Y perpendicular to the first direction X. Along the extension direction of the second insulation portion 241, the thickness of the connecting portion 2421, the thickness of the guide portion 2422, and the thickness of the extension portion 2423 decrease gradually. In other words, the second insulation portion 242 tapers in thickness when approaching the active material region 2222 of the electrode assembly 22. In an example, the thickness of the connecting portion 2421 and the thickness of the extension portion 2423 remain constant, the thickness b1 of the connecting portion 2421 is equal to a first thickness, the thickness b3 of the extension portion 2423 is equal to a second thickness, and the thickness b2 of the guide portion 2422 decreases gradually from the first thickness to the second thickness. In another example, the thickness of the connecting portion 2421 and/or the thickness of the extension portion 2423 is variable, for example, linearly variable. In this case, the maximum value of the thickness b2 of the guide portion 2422 is less than or equal to the minimum thickness of the connecting portion 2421, and the minimum value of the thickness b2 of the guide portion 2422 is greater than or equal to the maximum thickness of the extension portion 2423.

By optimizing the thickness distribution of the second insulation portion 242, the thicknesses of the second insulation portion 242 at different positions can meet the layout requirements of different regions in the shell 21, thereby not only improving the insulation reliability, but also avoiding squeezing the electrode plates in the shell 21, and minimizing the capacity loss of the battery.

In some embodiments, as shown in FIG. 11, the length h3 of the extension portion 2423 along the first direction X satisfies 0<h3≤7 mm.

The length h3 of the extension portion 2423 along the first direction X is directly related to the size of the contact region between the second insulation portion 241 and the active material region 2221. An appropriate contact region can provide reliable insulative connection between the electrode assembly 22 and the sidewall 211, and provide position-limiting support for the electrode assembly 22 along the second direction Y, thereby alleviating the wobble of the electrode assembly 22 in the shell.

In some embodiments, the shell 21 is cylindrical. The outer edge of the first insulation portion 241 is circular. The outer diameter of the second insulation portion 242 is less than or equal to the inner diameter of the sidewall 211 of the shell 21.

The second insulation portion 242 includes an inner side and an outer side disposed opposite to each other. The outer diameter of the second insulation portion 242 means a diameter of a circular cross-section of the outer side of the second insulation portion 242 sectioned along a plane perpendicular to the first direction X. The outer side of the second insulation portion 242 directly fits and aligns with the inner surface of the sidewall 211 of the shell 21. In some examples, the outer side of the second insulation portion 242 is a flat and even surface. The inner side of the second insulation portion 242 may assume a stepped shape, so that the thickness of the second insulation portion 242 along the first direction X changes stepwise.

The outer diameter of the second insulation portion 242 being set to be less than or equal to the inner diameter of the sidewall 211 makes it convenient to fit the insulation piece 24 into the shell 21, and reduces the difficulty of assembling.

In some embodiments, observed along a direction from the first end wall 212 to the electrode assembly 22, the outer diameter of the second insulation portion 242 increases gradually along a direction away from the first insulation portion 241.

The outer diameter of the second insulation portion 242 is a dimension of an outer surface away from the electrode assembly 22. The first insulation portion 241 is circular, and the second insulation portion 242 forms a cylindrical or conical shape along the edge of the first insulation portion 241. The outer diameter of the second insulation portion 242 increases gradually along a direction away from the first insulation portion 241, so that the opening end of the second insulation portion 242 flares out.

In these embodiments, the flaring opening of the second insulation portion 242 can implement a closer fit between the second insulation portion 242 and the inner surface of the sidewall 211 of the shell 21, reduce the capacity loss caused by a clearance between the second insulation portion and the sidewall, and facilitate the assembling in the battery.

FIG. 12 is a cross-sectional view of an insulation piece 24 sectioned along a C-C direction according to yet some other embodiments of this application. In some embodiments, as shown in FIG. 12, the second insulation portion 242 includes a connecting portion 2421 and a guide portion 2422 disposed in sequence along a direction away from the first insulation portion 241. An outer diameter D1 of the connecting portion at a junction between the connecting portion 2421 and the guide portion 2422, an outer diameter D2 of the guide portion 2422 at one end away from the connecting portion 2421, and an inner diameter D of the sidewall 211 of the shell 21 satisfy: $D1 \leq D2 \leq D$.

The outer diameter D2 of the guide portion 2422 at one end away from the connecting portion 2421 means a diameter of the outer side of the guide portion at the opening of the guide portion 2422. The outer diameter D1 of the connecting portion at the junction between the connecting portion 2421 and the guide portion 2422 is actually also the outer diameter of the connecting portion 2421 at an end away from the first insulation portion 241. The inner diameter D of the sidewall 211 means a diameter of an inner surface in a cross-section of the sidewall 211 sectioned along a plane perpendicular to the first direction X.

When $D1 \leq D2 \leq D$, the outer diameter of the second insulation portion 242 as a whole increases gradually along a direction away from the first insulation portion 241. Specifically, the outer diameter may increase stepwise or increase gradually in a linear uniform manner.

By setting an appropriate numerical relationship between the outer diameter of the connecting portion 2421 and the outer diameter of the guide portion 2422, the insulation piece 24 can be smoothly put into the shell 21. At the same time, the flaring opening of the second insulation portion 242 is more suitable for closely fitting the inner side of the shell 21, thereby reducing unnecessary capacity loss.

In some embodiments, as shown in FIG. 12, the second insulation portion 242 further includes an extension portion 2423. The extension portion 2423 is located at one end of the guide portion 2422, the end being away from the connecting portion 2421. An outer diameter D3 of the extension portion 2423 at one end away from the guide portion 2422 satisfies: $D1 \leq D2 \leq D3 \leq D$.

The guide portion 2422 is located between the connecting portion 2421 and the extension portion 2423. The outer diameter D2 of the guide portion 2422 at one end away from the connecting portion 2421 is actually the outer diameter of the guide portion at the junction between the guide portion 2422 and the extension portion 2423.

The outer diameters of the connecting portion 2421, guide portion 2422, and extension portion 2423 of the second insulation portion 242 at the end away from the first insulation portion 241 increase stepwise, thereby making it convenient to fit the insulation piece 24 into the shell 21 and reduce the difficulty of assembling.

In some embodiments, the inner diameter D of the sidewall 211 of the shell satisfies: 44.8 mm≤D≤45.5 mm. The outer diameter D1 of the connecting portion at the junction between the connecting portion 2421 and the guide portion 2422 satisfies: 43.5 mm≤D1≤45.5 mm. The outer diameter D2 of the guide portion 2422 at one end away from the connecting portion 2421 satisfies: 44.5 mm≤D2≤45.5 mm. The outer diameter D3 of the extension portion 2423 at one end away from the guide portion 2422 satisfies: 44.7 mm≤D3≤45.5 mm.

The outer diameters of different parts of the second insulation portion are selected reasonably according to the inner diameter of the shell of the battery, thereby optimizing the structural layout in the shell 21 and simplifying the assembling process.

Figure 13:
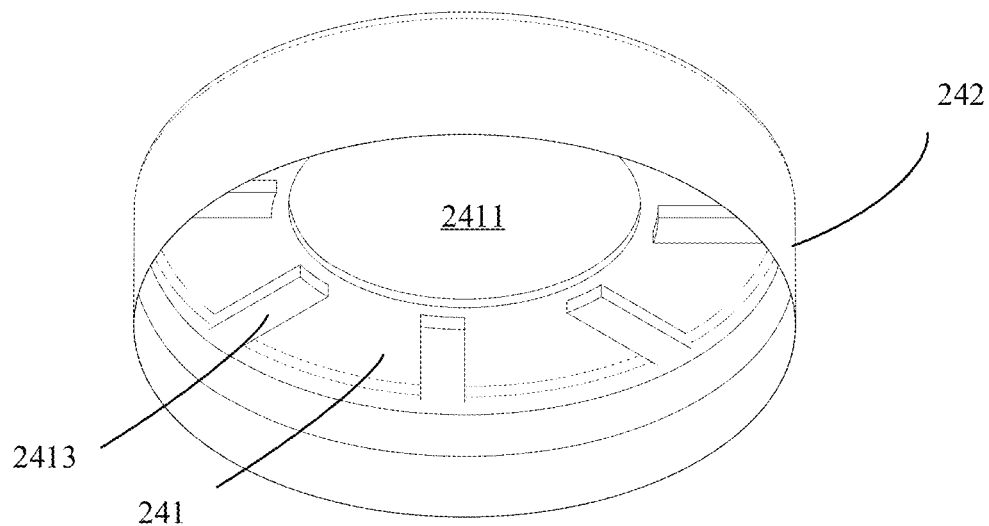
FIG. 13 is a three-dimensional view of an insulation piece according to some other embodiments of this application.

FIG. 13 is a three-dimensional view of an insulation piece 24 according to some other embodiments of this application. In some embodiments, as shown in FIG. 13, the insulation piece 24 further includes at least one boss 2413. The at least one boss 2413 is located on a first side of the first insulation portion 241, and is configured to abut the current collecting component 23.

The boss 2413 is located on the first side of the first insulation portion 241, and protrudes outward from the surface of the first side. The number of the bosses 2413 may be singular or plural. When being plural, the plurality of bosses may be evenly spaced out around the center of the first insulation portion 241.

To fit the insulation piece 24 into the shell 21, the boss 2413 can abut the upper surface of the current collecting component 23, so as to provide a supporting force for the current collecting component 23, and in turn, alleviate the deformation of the current collecting component 23 under stress.

In some embodiments, the at least one boss 2413, the first insulation portion 241, and the second insulation portion 242 are injection-molded in one piece.

The one-piece injection molding can form an insulation piece 24 with a complex surface in a single pass, thereby reducing the workload of secondary processing of components, and reducing the manufacturing cost.

In some embodiments, the insulation piece 24 is connected to an inner surface of the shell 21 by adhesive bonding.

The insulation piece 24 can make the first insulation portion 241 bonded to the inner side of the first end wall 212 by adhesive bonding; make the second insulation portion 242 bonded to the inner side of the sidewall 211 by adhesive bonding; and make both the first insulation portion 241 and the second insulation portion 242 bonded to the first end wall 212 and the sidewall 211 respectively at the same time.

The bonding method can simplify the assembling of the insulation piece 24 and prevent the insulation piece 24 from moving or rotating relative to the shell 21 and from interfering with connection of other components in the shell, thereby improving the reliability of insulation.

Figure 14:
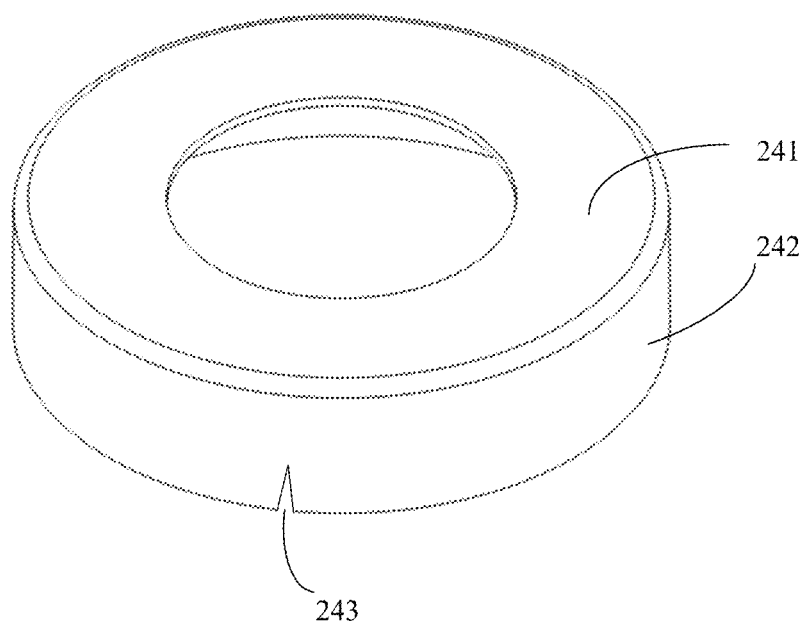
FIG. 14 is a three-dimensional view of an insulation piece according to still some other embodiments of this application.

FIG. 14 is a three-dimensional view of an insulation piece 24 according to still some other embodiments of this application. In some embodiments, as shown in FIG. 14, at least one notch 243 is provided at one end of the second insulation portion 242, the end being away from the first insulation portion 241.

The notch 243 is located at an opening-forming end of the second insulation portion 242. For example, the notch 243 is located at one end of the extension portion 2423, the end being away from the first insulation portion 241. The number of the notches 243 may be singular or plural. When being plural, the plurality of notches 243 are spaced out along the circumference of the second insulation portion 242. In an example, three notches 243 are provided. The notch 243 may be rectangular, trapezoidal, or arcuate in shape. In an example, the length of the notch 243 along the first direction X is greater than the length along the second direction Y.

With the notch 243 provided at one end, away from the first insulation portion 241, of the second insulation portion 242, a deformation space is provided for the operation of putting the insulation piece 24 into the shell and the operation of mounting a tab, thereby releasing stress and reducing the difficulty of assembling.

According to a second aspect, an embodiment of this application provides a battery. The battery includes the battery cell disclosed in the above embodiment.

According to a third aspect, an embodiment of this application provides an electrical device. The electrical device includes the battery disclosed in the above embodiment. The battery is configured to provide electrical energy.

The following gives a more detailed description of the battery cell 20 according to some embodiments of this application with reference to FIG. 3 to FIG. 14.

The battery cell 20 includes a shell 21, an electrode assembly 22, a current collecting component 23, an insulation piece 24, and an electrode post 25. The shell 21 includes a sidewall 211 and a first end wall 212 connected to the sidewall. The electrode post 25 is dielectrically mounted on the first end wall 212 of the shell 21. The electrode assembly 22 is located in the shell 21. The electrode assembly 22 includes a first tab 221 and a main portion 222 connected to the first tab. The current collecting component 23 is electrically connected to the first tab 221 and the electrode post 25 separately. The insulation piece 24 includes a first insulation portion 241 and a second insulation portion 242. The second insulation portion 242 is peripherally disposed at an outer edge of the first insulation portion 241 and protrudes outward from the first side of the first insulation portion 241. The first insulation portion 241 is located between the first end wall 212 and the current collecting component 23. The second insulation portion 242 is located between the electrode assembly 22 and the sidewall 211.

The electrode post 25 includes an electrode post body 252, and a first fixing portion 251 and a second fixing portion 253 located at two ends of the electrode post body 252 respectively. The first fixing portion 251 is located on one side of the first end wall 212, the side facing the electrode assembly 22. The second fixing portion 253 is located on one side of the first end wall 212, the side facing away from the electrode assembly 22. The first end wall 212 is provided with a mounting through-hole. The electrode post body 252 is at least partially accommodated in the mounting through-hole. The first fixing portion 251 and the second fixing portion 253 are configured to clamp a part of the first end wall 212. The main portion 222 includes an active material region 2221 and an insulation region 2222. The insulation region 2222 is located between the active material region 2221 and the first tab 221.

The second insulation portion 242 includes a connecting portion 2421, a guide portion 2422, and extension portion 2423 disposed in sequence along a direction away from the first insulation portion 241. Along the direction away from the first insulation portion 241, the inner surface of the guide portion 2422 is inclined closer to the sidewall 211. The thickness of the connecting portion 2421 is equal to that of the first insulation portion 241. The thickness of the connecting portion 2421, the thickness of the guide portion 2422, and the thickness of the extension portion 2423 decline stepwise. In an example, the thicknesses of the connecting portion 2421 and the extension portion 2423 remain constant, and the thickness of the guide portion 2422 decreases gradually from a first thickness to a second thickness, where the first thickness is the same as that of the connecting portion 2421, and the second thickness is the same as that of the extension portion 2423.

Along the first direction X, the length h1 of the connecting portion 2421, the thickness t1 of the first fixing portion 251, the thickness t2 of the current collecting component 23, and the height t3 of the first tab 221 satisfy: $h1 \leq t1+t2+t3$. Along the first direction X, the length h1 of the connecting portion 2421, the length h2 of the guide portion 2422, the thickness t1 of the first fixing portion 251, the thickness t2 of the current collecting component 23, the height t3 of the first tab 221, and the height w of the insulation region 2222 satisfy: $h1+h2 \leq t1+t2+t3+w$.

The thickness b1 of the connecting portion 2421 satisfies $0.2 \text{ mm} \leq b1 \leq 1 \text{ mm}$, the thickness b3 of the extension portion 2423 satisfies 0.02 mm≤b3≤0.1 mm, and the thickness b2 of the guide portion 2422 decreases gradually from the thickness b1 of the connecting portion 2421 to the thickness b3 of the extension portion 2423 in a direction away from the first insulation portion 241.

The length h1 of the connecting portion 2421 along the first direction X satisfies 0<h1≤3.3 mm, the length h2 of the guide portion 2422 along the first direction X satisfies 1 mm≤h2≤8.5 mm, and the length h3 of the extension portion 2423 along the first direction X satisfies 0<h3≤7 mm.

The inner diameter D of the sidewall 211 of the shell satisfies: 44.8 mm≤D≤45.5 mm. The outer diameter D1 of the connecting portion at the junction between the connecting portion 2421 and the guide portion 2422 satisfies: 43.5 mm≤D1≤45.5 mm. The outer diameter D2 of the guide portion 2422 at one end away from the connecting portion 2421 satisfies: 44.5 mm≤D2≤45.5 mm. The outer diameter D3 of the extension portion 2423 at one end away from the guide portion 2422 satisfies: 44.7 mm≤D3≤45.5 mm, and D1≤D2≤D3≤D.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A battery cell, comprising:
   a shell, comprising a sidewall and a first end wall connected to the sidewall;
   an electrode post, dielectrically mounted on the first end wall;
   an electrode assembly, located in the shell, wherein the electrode assembly comprises a first tab, and the first tab faces the first end wall and is electrically connected to the electrode post; and
   an insulation piece, comprising a first insulation portion and a second insulation portion, wherein the second insulation portion is peripherally disposed at an outer edge of the first insulation portion and protrudes toward a side at which the electrode assembly is located, wherein
   the first insulation portion is located between the first end wall and the first tab, and at least a part of the second insulation portion is located between the first tab and the sidewall,
   the second insulation portion comprises a guide portion, and the guide portion is located at one end of the second insulation portion, the end being away from the first insulation portion; and, along a direction away from the first insulation portion, an inner surface of the guide portion is inclined closer to the sidewall,
   the second insulation portion comprises a connecting portion, two ends of the connecting portion are connected to the first insulation portion and the guide portion respectively, and a thickness of the connecting portion is greater than or equal to a maximum thickness of the guide portion, and
   the thickness of the connecting portion is less than a thickness of the first insulation portion.

2. The battery cell according to claim 1, wherein the guide portion gradually tapers in thickness along the direction away from the first insulation portion.

3. The battery cell according to claim 1, wherein a difference between the thickness of the connecting portion and the thickness of the first insulation portion is less than or equal to 0.2 mm.

4. The battery cell according to claim 1, wherein the electrode post comprises an electrode post body, and a first fixing portion and a second fixing portion located at two ends of the electrode post body respectively, and the first fixing portion is located on one side of the first end wall, the side facing the electrode assembly; the second fixing portion is located on one side of the first end wall, the side facing away from the electrode assembly; the first end wall is provided with a mounting through-hole, the electrode post body is at least partially accommodated in the mounting through-hole, and the first fixing portion and the second fixing portion are configured to clamp a part of the first end wall;
   the battery cell further comprises a current collecting component, and the current collecting component is at least partially located between the first tab and the first fixing portion, and is electrically connected to the first tab and the first fixing portion separately; and
   a part of the first insulation portion is located between the first fixing portion and the first end wall.

5. The battery cell according to claim 4, wherein
   the electrode assembly further comprises a main portion, the first tab is connected to the main portion, the main portion comprises an active material region and an insulation region, and the insulation region is located between the active material region and the first tab.

6. The battery cell according to claim 5, wherein, along a direction from the first end wall to the electrode assembly, the connecting portion does not extend beyond one end of the insulation region, the end being close to the first end wall.

7. The battery cell according to claim 6, wherein, along a thickness direction of the first end wall, a length h1 of the connecting portion, a thickness t1 of the first fixing portion, a thickness t2 of the current collecting component, and a height t3 of the first tab satisfy: h1≤t1+t2+t3.

8. The battery cell according to claim 5, wherein, along a direction from the first end wall to the electrode assembly, the guide portion does not extend beyond one end of the insulation region, the end being close to the active material region.

9. The battery cell according to claim 5, wherein a receptacle is formed on one side of the first insulation portion, the side facing the electrode assembly; and the first fixing portion of the electrode post is at least partially accommodated in the receptacle.

10. The battery cell according to claim 9, wherein, along a thickness direction of the first end wall, a depth of the receptacle is less than or equal to a thickness of the first fixing portion.

11. The battery cell according to claim 9, wherein, along a direction from the first end wall to the electrode assembly, the connecting portion does not extend beyond one end of the insulation region, the end being close to the first end wall.

12. The battery cell according to claim 9, wherein, along a direction from the first end wall to the electrode assembly, the guide portion does not extend beyond one end of the insulation region, the end being close to the electrode assembly.

13. The battery cell according to claim 5, wherein the second insulation portion further comprises an extension portion, and the extension portion is connected to one end of the guide portion, the end being away from the connecting portion; a thickness of the extension portion is less than or equal to a minimum thickness of the guide portion; and the extension portion is at least partially located between the active material region and the sidewall.

14. The battery cell according to claim 13, wherein the thickness b1 of the connecting portion satisfies: 0.2 mm≤b1≤1 mm, and the thickness b3 of the extension portion satisfies: 0.02 mm≤b3≤0.1 mm.

15. The battery cell according to claim 14, wherein a length h3 of the extension portion satisfies 0<h3≤7 mm.

16. The battery cell according to claim 14, wherein the shell is cylindrical; the outer edge of the first insulation portion is circular, and an outer diameter of the second insulation portion is less than or equal to an inner diameter of the sidewall of the shell.

17. The battery cell according to claim 16, wherein, along a direction from the first end wall to the electrode assembly, the outer diameter of the second insulation portion increases gradually.

18. The battery cell according to claim 4, wherein the insulation piece further comprises at least one boss, and the at least one boss is located on a surface of the first insulation portion on one side close to the electrode assembly, and is configured to abut the current collecting component.

19. The battery cell according to claim 18, wherein the at least one boss, the first insulation portion, and the second insulation portion are injection-molded in one piece.

20. The battery cell according to claim 1, wherein the insulation piece is connected to an inner surface of the shell by adhesive bonding.

21. The battery cell according to claim 1, wherein at least one notch is provided at one end of the second insulation portion, the end being away from the first insulation portion.

22. A battery, comprising the battery cell according to claim 1.

* * * * *